Figure 1:
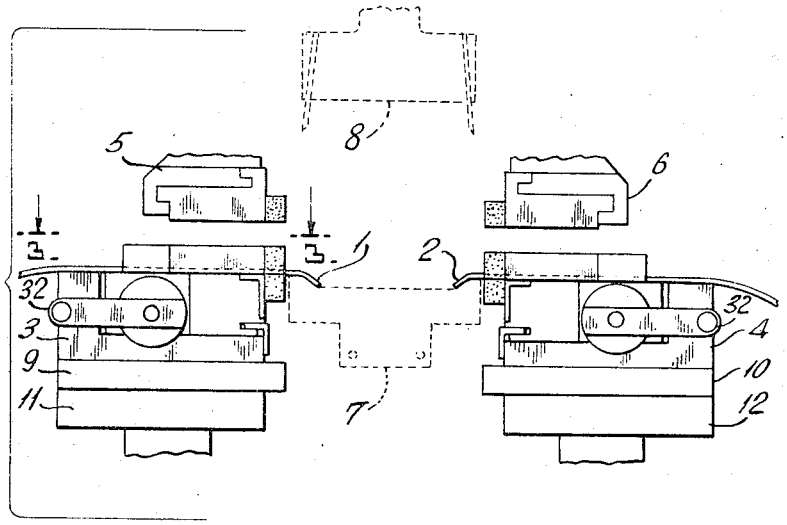
Figure 2:
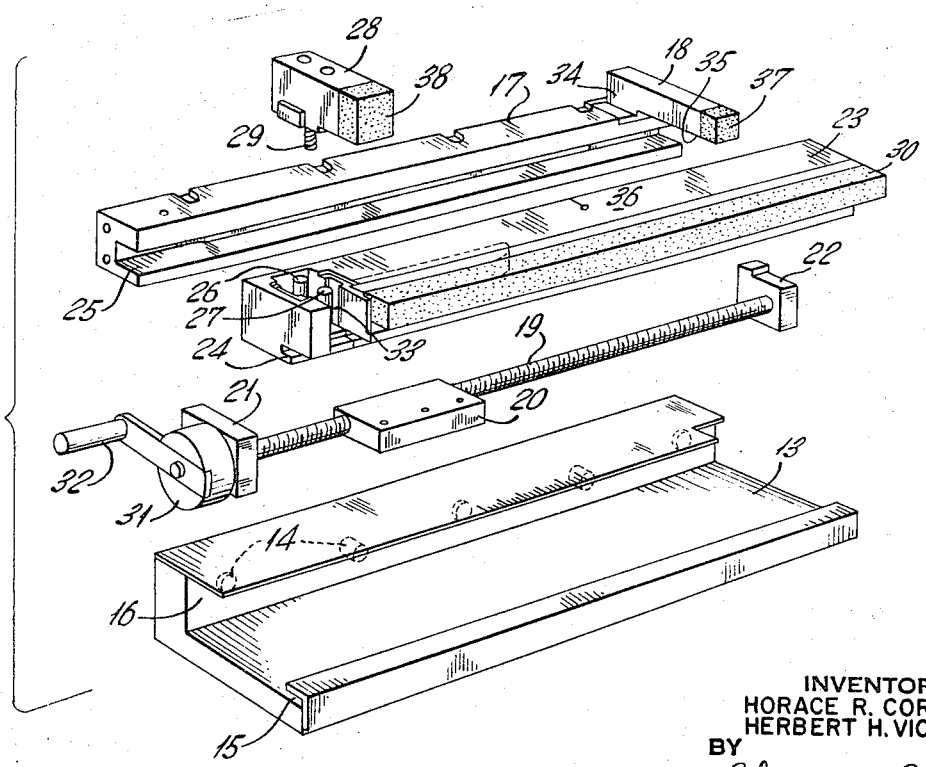

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1148

T878,015

UNIVERSAL CLAMP FOR SPLICING INNER TUBES

Horace R. Corbin, Jr., 10 Wisteria Drive, Kensington Garden Apts., Fords, N.J. 08863, and Herbert H. Vickers, Newbury Neck Road, Surry, Maine 04684

Filed July 31, 1969, Ser. No. 846,439

Int. Cl. B25b *1/20*

U.S. Cl. 269—43

3 Sheets Drawing. 11 Pages Specification

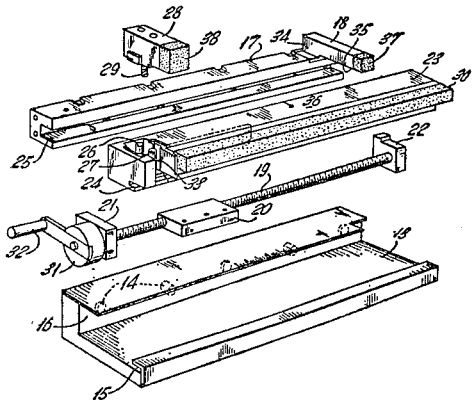

An adjustable clamp for holding one end of an unvulcanized inner tube, to be spliced to a mating end when held in a similar clamp in coplanar and parallel relationship, is characterized by an adjustable first jaw and a second fixed jaw. The length of the second jaw is in excess of the maximum extensible length of the adjustable jaw. The adjustable jaw has a first fence carried on a transverse segment, the working surface of which is movable in a direction normal to the inner face and in contact with the lower face of the first fence. The first jaw also has a second fence which is mounted on and retractable into the transverse segment. Means are provided for urging the second fence above the working surface of the transverse segment. Also, means are provided for moving the transverse segment to permit lateral displacement between the first and second fence. The fixed jaw has one end in alignment with the inner face of the first fence, and the opposite end in overlying relationship to the second fence, so that when the fixed jaw is moved toward the adjustable jaw to clamp the inner tube, the second fence is retracted into the transverse segment.

UNIVERSAL CLAMP FOR SPLICING INNER TUBES

Filed July 31, 1969 3 Sheets-Sheet 1

INVENTORS
HORACE R. CORBIN JR
HERBERT H. VICKERS
BY
Charles A. Cohen
AGENT

UNIVERSAL CLAMP FOR SPLICING INNER TUBES
Filed July 31, 1969 3 Sheets-Sheet 2
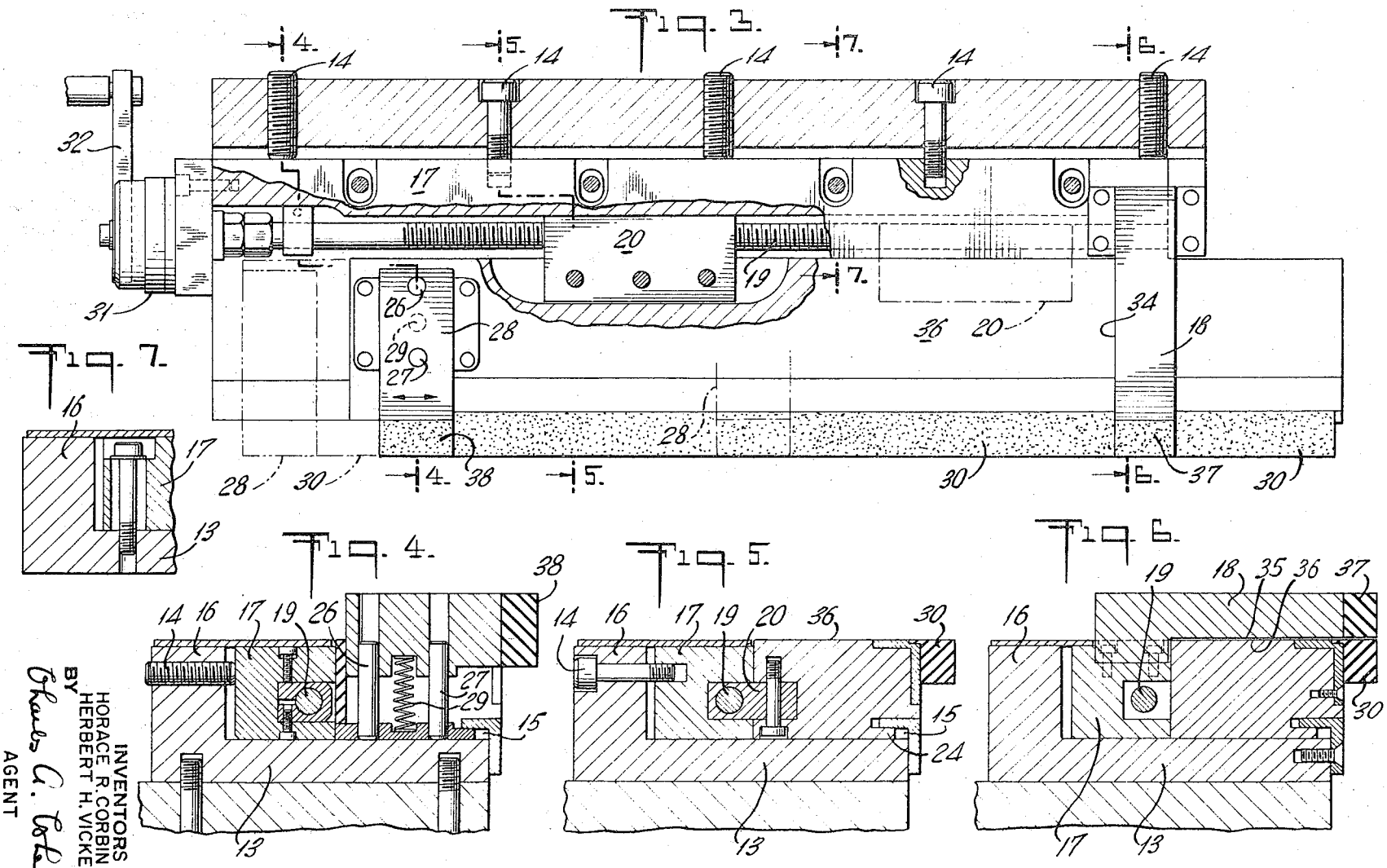
INVENTORS
HORACE R. CORBIN JR
HERBERT H. VICKERS
BY
Charles A. Cohen
AGENT UNIVERSAL CLAMP FOR SPLICING INNER TUBES
Filed July 31, 1969 3 Sheets-Sheet 3
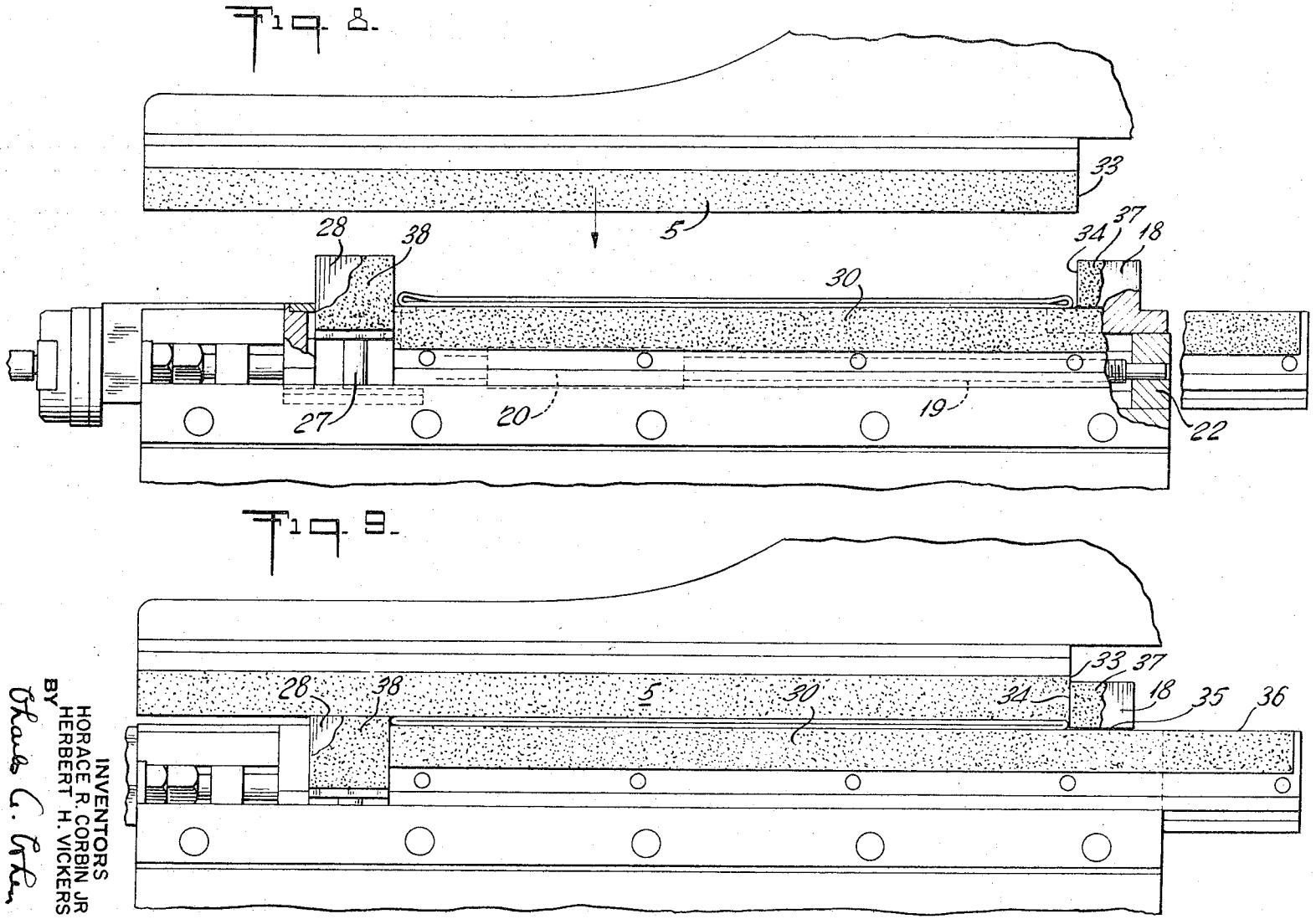
INVENTORS
HORACE R. CORBIN JR
HERBERT H. VICKERS
BY
Charles G. Cohen
AGENT